United States Patent [19]

Shubin

[11] Patent Number: 4,770,468
[45] Date of Patent: Sep. 13, 1988

[54] CHILD SAFETY CAR SEAT

[76] Inventor: Steven A. Shubin, 5699 Canan Rd., Agoura Hills, Calif. 91301

[21] Appl. No.: 948,327

[22] Filed: Dec. 31, 1986

[51] Int. Cl.⁴ .................. A47D 15/00; B60R 21/00
[52] U.S. Cl. .................. 297/487; 297/250; 297/467; 297/484; 297/488
[58] Field of Search .......... 297/487, 488, 250, 257, 297/154, 216, 467, 484, 486, 469

[56] References Cited

U.S. PATENT DOCUMENTS

| | | | |
|---|---|---|---|
| 2,668,583 | 2/1954 | Singer | 297/488 |
| 2,851,084 | 9/1958 | Benjetsky | 297/467 X |
| 3,887,233 | 6/1975 | Garavaglia et al. | 297/484 |
| 4,025,111 | 5/1977 | Tanaka et al. | 298/487 X |
| 4,175,786 | 11/1979 | Schaller et al. | 297/487 X |
| 4,186,962 | 2/1980 | Meiker | 297/484 X |
| 4,537,446 | 8/1985 | Roney et al. | 297/464 |
| 4,655,506 | 4/1987 | Wise et al. | 297/488 X |
| 4,688,850 | 8/1987 | Brownlie et al. | 297/250 X |

FOREIGN PATENT DOCUMENTS

| | | | |
|---|---|---|---|
| 0170116 | 2/1986 | European Pat. Off. | 297/484 |
| 2222251 | 12/1972 | Fed. Rep. of Germany | 297/484 |
| 2712917 | 9/1978 | Fed. Rep. of Germany | 297/484 |
| 86/02050 | 4/1986 | World Int. Prop. O. | 297/484 |

*Primary Examiner*—Kenneth J. Dorner
*Assistant Examiner*—Laurie K. Cranmer
*Attorney, Agent, or Firm*—Poms, Smith, Lande & Rose

[57] ABSTRACT

An automobile car seat for a child is provided with a tray which is pivoted slightly above and behind the shoulders of the child who is to sit in the seat. Shoulder and lap straps are secured to the pivoted tray structure so that as the tray is swung down into position, the shoulder and lap straps automatically come into position to hold the child in place. The tray is provided with a large padded center post which locks into position into the chair seat as the tray is swung forward into position. As the child gets older and bigger, the position of the shoulder straps may be raised and locked into their new position. The seat and back may be tilted as a unit by raising the front of the seat, so that the child can lean back and sleep.

9 Claims, 4 Drawing Sheets

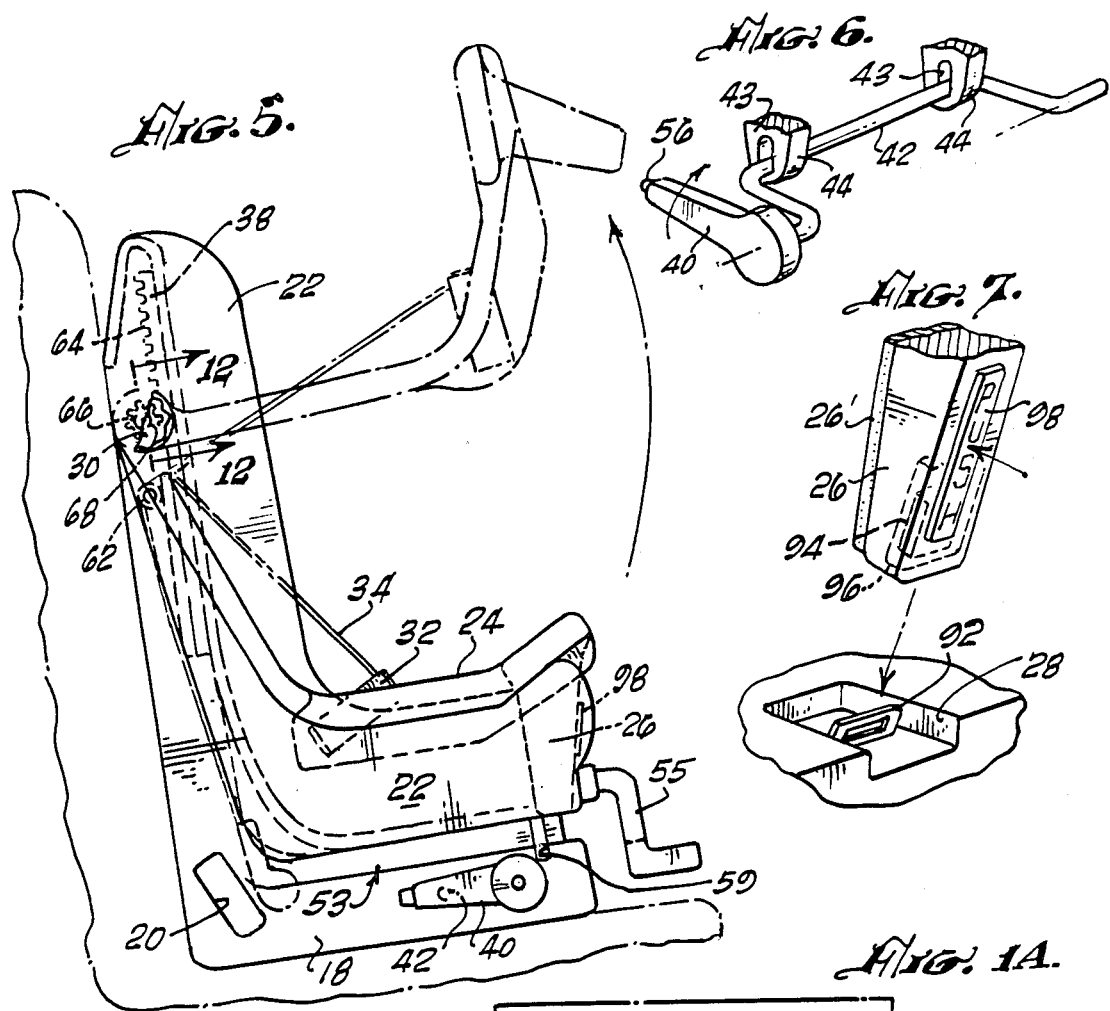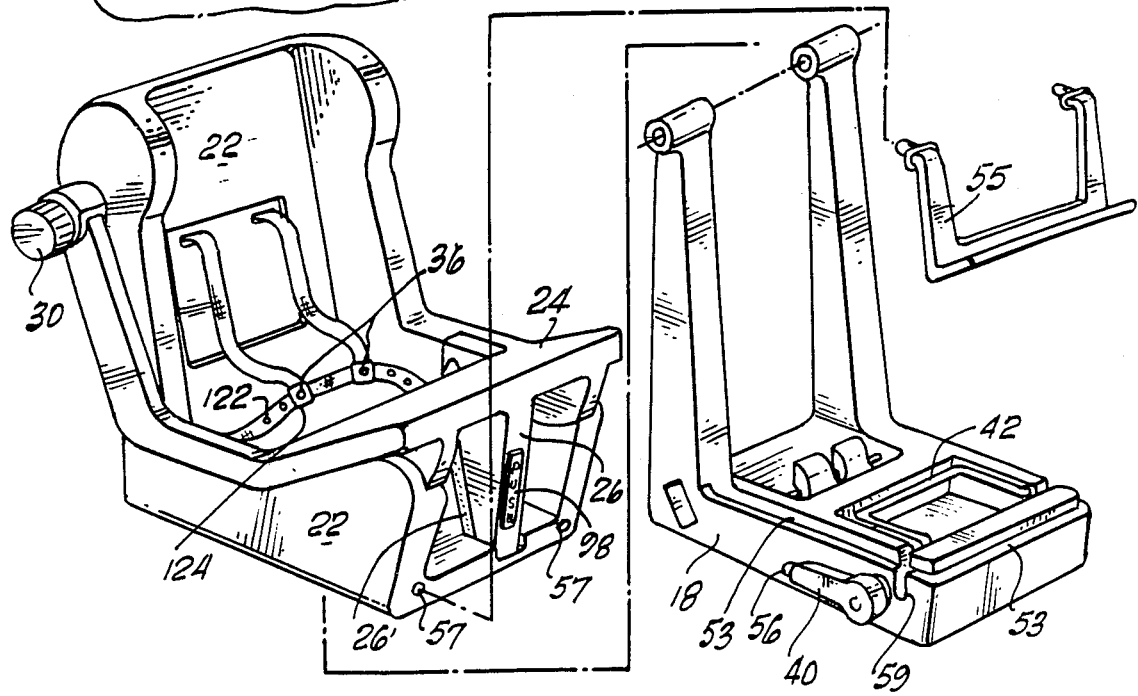

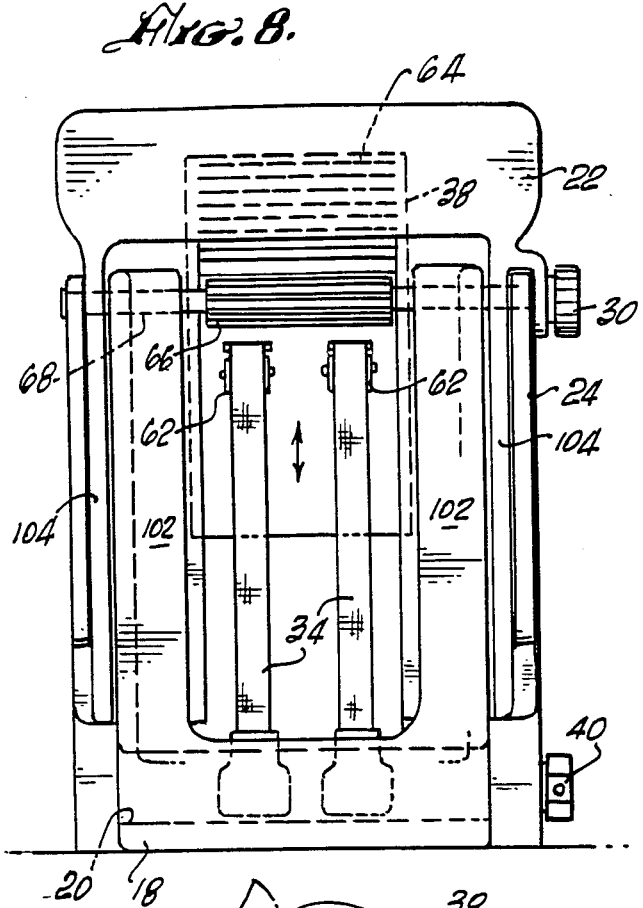
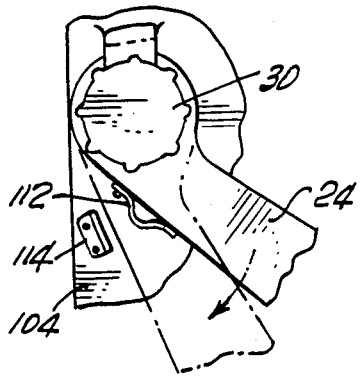
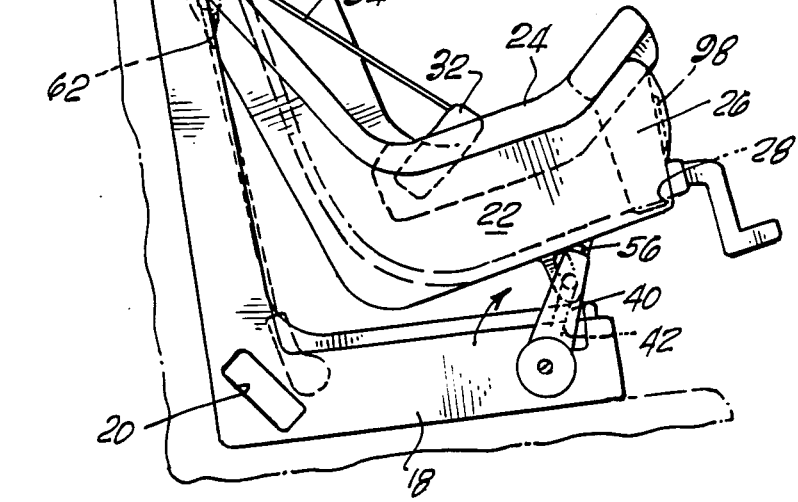

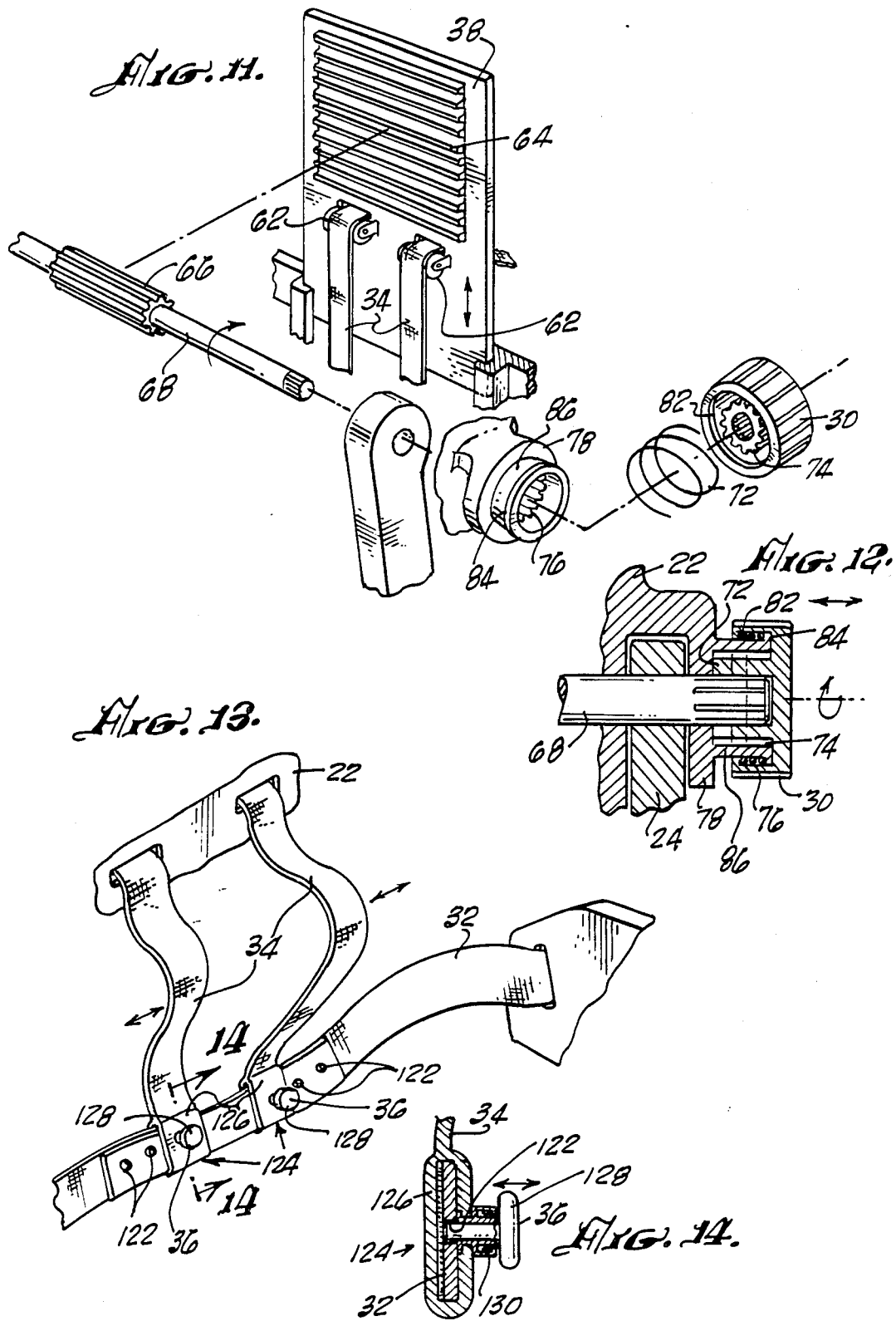

CHILD SAFETY CAR SEAT

FIELD OF THE INVENTION

This invention relates to automobile safety seats for children.

BACKGROUND OF THE INVENTION

Prior seat belt restraint systems for children's automobile seats normally have so many separate belts and straps to be secured in position that the child does not normally get strapped in properly, with both shoulder and seat belts in place. In addition, the strap or other fastening member which normally extends down between a child's legs is often relatively small and can injure the child, particularly a male child, in the course of an accident or emergency stop.

Accordingly, a principal object of the present invention is to provide a child's automobile safety seat in which the seat belts are automatically secured in place, and wherein the child is protected against injury of the type mentioned hereinabove.

SUMMARY OF THE INVENTION

In accordance with the present invention, a child's automobile car seat is provided with a tray which is pivoted at a point approximately behind the shoulders of the child, and to which both shoulder and lap belts or straps are secured, so that they are automatically shifted into their proper position when the tray is folded forward, after the child is seated in the car seat. In addition, the tray is provided with a moderately large size well-padded post which extends down between the legs of the child and locks in place into the chair seat. Accordingly, with a single movement of the tray from its raised position behind the child down into its forward and locked position, the child is fully secured into a safe configuration.

As an additional feature of the invention, the shoulder straps may be adjusted in their vertical position in the seat back, as the child grows, so that proper shoulder restraint is achieved for the child as the child gets older and larger. In each adjusted position, the location of the shoulder straps is locked, so that only periodi adjustments of the shoulder strap heights need be made, and regular adjustment is not required.

As a collateral feature of the invention, the front of the seam may be raised or tilted forward relative to an underlying base or support, so that the child may lean back in the seat for sleeping while the car is being driven. In one preferred embodiment the tray and the car seat are pivotally mounted relative to the base about a single shaft which, as noted above may be mounted approximately behind the shoulders of a child using the seat. To avoid the possibility of pinching the child's fingers as the seat is lowered, clearance is provided between the seat and the underlying base.

Other objects, features and advantages of the invention will become apparent from a consideration of the following detailed description and from the accompanying drawings.

BRIEF DESCRIPTION OF THE DRAWINGS

FIG. 1A is an exploded isometric view of the child seat of FIG. 1;

FIG. 5 is a diagrammatic side view of the chair seat of FIG. 1 showing the mode of operation of the tray, and the method of adjusting the height of the shoulder straps;

FIG. 6 is a diagrammatic view showing the mode of operation of the tilting mechanism for raising the front of the car seat;

FIG. 7 is a diagrammatic showing of the locking arrangements for securing the center post attached to the tray to the underlying seat base;

FIG. 8 is a rear elevational view of the car seat of FIG. 1 showing the mode of adjustment for the shoulder belts;

FIG. 9 is a view showing the child seat adjusted to its reclining position;

FIG. 10 is a detail showing the shock absorbing arrangements which come into play in the event that the tray is dropped;

FIG. 11 is an exploded view showing diagrammatically the mode of operation of the shoulder belt adjusting and locking mechanism;

FIG. 12 is a cross-sectional view through a portion of the mechanism of FIG. 11;

FIG. 13 shows the shoulder belts attached to the seat belt; and

FIG. 14 illustrates the adjustment arrangements for varying the spacing of the shoulder belts on the seat belt.

DETAILED DESCRIPTION OF PREFERRED EMBODIMENT

Figure 1:
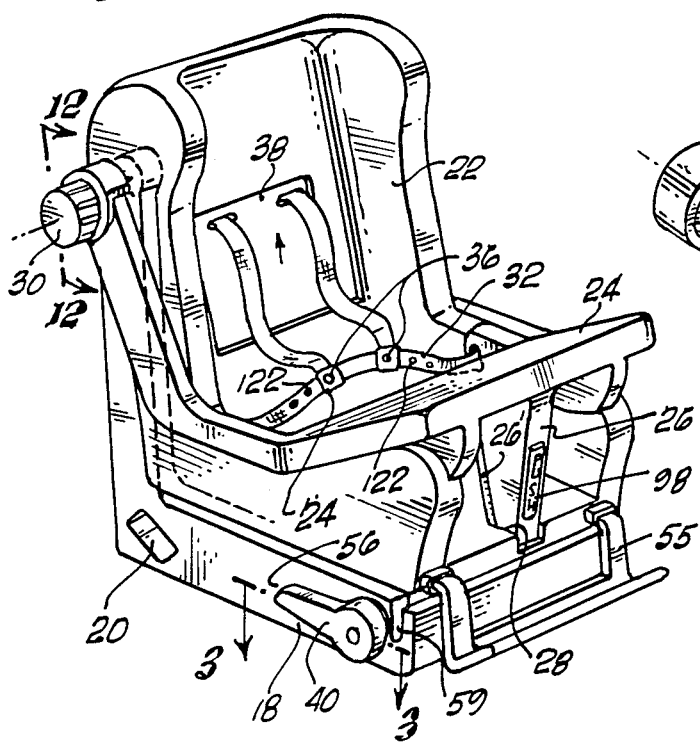
FIG. 1 is an isometric view of a child seat assembly illustrating the principles of the present invention.

Referring more particularly to the drawings, FIG. 1 is an isometric view of a child's car seat illustrating the principles of the invention. More particularly, the seat of FIG. 1 includes a base 18, with transverse openings 20 extending through the rear thereof to receive a seat belt tohold the assembly in place on the seat of an automobile. The assembly of FIG. 1 also includes the tiltable chair 22 in which the child sits, and the tray assembly 24 to which is rigidly attached a large central padded post 26 which locks down into the seat 22 at recess 28. Both the tiltable chair seat 22 and the tray 24 are rotatable about the axis of the handle 30, which axis extends transversely through the back of the assembly, and through support arms extending upwardly from the base 18 as shown in FIG. 8.

A seat belt 32 is secured to the side arms of the tray 24, so that, as the tray is pivoted forward after the child is sitting in the seat 22, that the lap seat belt 32 will be automatically positioned to restrain the child. In addition, the shoulder straps 34 are attached to the lap belt 32 at points 36 so that, as the tray 24 is pivoted forward, they will be brought in place to engage the shoulders of the child, concurrently with the positioning of the lap seat belt 32 in position. The shoulder straps 34 are mounted on a movable support 38 by which the height of the shoulder straps may be adjusted, as disclosed in greater detail hereinbelow in connection with subsequent figures of the drawings.

Figure 4:
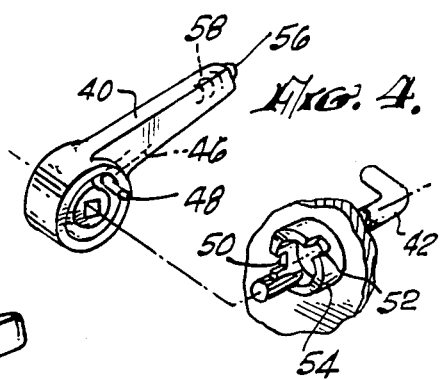
FIG. 4 is an exploded view of the locking mechanism associated with the tilt handle shown in cross section in FIG. 3.
Figure 3:
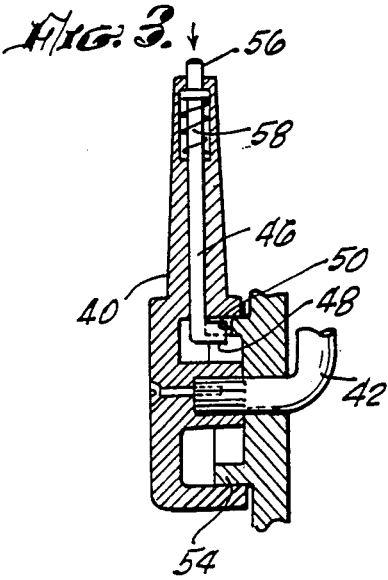
FIG. 3 is a cross-sectional view of a seat tilt handle mechanism taken along lines 3—3 of FIG. 1.
Figure 2:
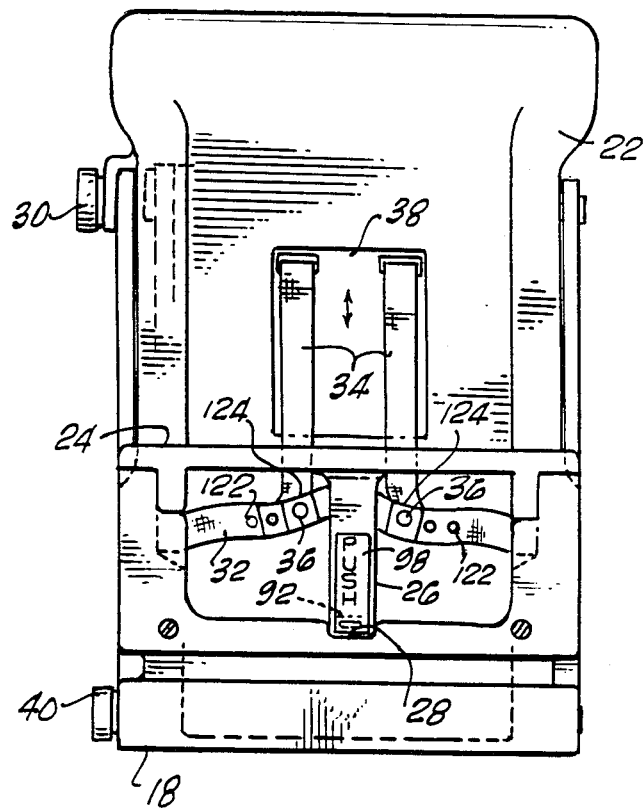
FIG. 2 is a front elevational view of the child seat of FIG. 1.

Now, the chair seat 22 may be tilted about the axis of handle 30, by raising the front of the seat, under the control of the lever 40. As indicated to advantage in FIGS. 3 through 6 and 9, the lever 40 is rigidly attached to a crank arm 42 which extends through openings 43 in the depending portions 44 forming part of the seat 22. As the handle 40 is rotated, the crank 42 engages the inner surface of the openings 43, raising the front of the seat 22, with the seat pivoting about the axis of the handle 30, and tilting the back of the child's seat to the rear so that the child may more readily sleep, to the position which is shown in advantage in FIG. 9. A locking mechanism including the rod 46 is provided to lock the seat 22 in either its raised, or its lower positions. Thus, as shown to advantage in FIGS. 3 and 4, the rod 46 has a bent lower end 48 which may selectively engage one of the recesses 50 or 52 in the locking ring 54. Thus, in operation, if the seat is in the locked lower position as shown in FIG. 1, the rod 46 would be advanced toward the axis of the shaft 42 by depressing on the exposed end 56 of shaft 46, against the biasing force of the coil spring 58. The inward movement of the bent end 48 of the shaft 46 releases the lever 40 from its locking position provided by the engagement of the bent end 48 of shaft 46, with the recess 50, and permits clockwise rotation of the handle 40 to raise the seat 22 to its tilted position, as shown in FIG. 9. Upon release of the thumb button 56, the shaft 46 is free to move radially outward into engagement with the recess 52, thereby locking the lever 40 and the crankshaft 42 in the tilted or reclining position where the seat is raised, all as shown in FIG. 9.

It may also be noted that clearance 53 is provided in the zone where the seat 22 overlaps the base 18, so that a child's fingers cannot be pinched at this point. This configuration may be seen in FIG. 1A with the recess corner being designated by the reference numeral 53 at both the side and the front of the chair.

Also shown in FIGS. 1, 1A, 5 and 9 is the footrest 55 which is secured into recesses 57 in the front of the seat 22. Concerning one additional point, the recess 59 is provided for receiving a seat belt when the seat is to be reversed in its orientation, with the back of the child's seat facing forward, as is recommended for very young children or babies. In this connection, it may be recalled that the openings 20 are provided for receiving the seat belt, when the seat is facing forward.

The shoulder straps 34 may be adjusted in their vertical position along the back of the seat 22 to accommodate gradual changes in the size of the child as the child is growing, or to accommodate different children. The mechanism for adjusting the position of the seat belts 34 on the back of the chair, is indicated in some detail in FIG. 11 of the drawings. As indicated in this figure, the height of the panel 38 through which the seat belts 34 extend, after passing over the rollers 62, is vertically adjustable. More specifically, the extended flat rack 64 meshes with the gear teeth on the gear member 66 which is rigidly attached to the shaft 68. The shaft 68 is splined to the handle 30 so that the handle 30 is free to slide in and out, with the interfitting splines preventing relative rotation of the shaft 68 and the handle 30. The coil spring 72 normally biases the handle 30 inward so that the teeth 74 engage the mating teeth 76 on the fixed housing 78, thereby preventing rotation of the shaft 68. Of course, with the shaft 68 locked in its angular orientation, there is no relative movement of the gear 66 and the rack 64. Accordingly, the height adjustment of the straps 34 remains fixed. However, when it is desired to adjust the position of the straps 34 to a different vertical height, the handle 30 is pulled outwardly on the shaft 68, releasing the teeth 74 from the external teeth 76 on the housing 78, and thereby permitting rotation of the shaft 68 as the handle 30 is rotated. It may be noted in passing that the handle 30 is held in place by the shoulder 82 which cannot move to the right, as shown in FIG. 12, beyond the shoulder 84 on the end of the member 86 about which the handle 30 rotates. After the adjusting plate 38 is shifted to the desired elevation with the straps 34 being located in the desired position, the handle 30 may be released or moved inwardly toward the shaft 68, thereby locking the assembly in the newly adjusted position.

FIG. 7 is a detailed showing of the bottom of the post 26 forming part of the tray assembly, indicating how the post 26 is locked into the recess 28 in the seat 22. More particularly, the seat 22 has the metal loop 92 fixedly secured thereto, in the recess 28. The lower end of the post 26 has a catch 94 which is spring-biased forwardly and which has a tapered lower surface 96 for engagement and retraction by the top of the metal loop 92 and subsequent locking of catch 94 through the opening in the metal loop 92. Accordingly, as the tray assembly is swung forward, the post 26 is locked into the recess 28 in the base 18. A conventional release surface or pushbutton 98 is provided to depress the catch 94 and release the post 26 from the base 18 so that the tray may be raised as indicated in FIG. 5 of the drawings.

FIG. 8 is a rear elevational view of the seat assembly of FIG. 1. In FIG. 8 the base 18 with its two upstanding support arms 102 is shown to advantage. In addition, the rearwardly extending arms forming part of the tray assembly 24 are mounted to the base 18 by the shaft 68. Also pivotally mounted on the shaft 68 is the seat 22 which has two rearwardly extending ribs 104 immediately adjacent the upwardly extending arms 102 of the base member 18.

Turning now to the detail view of FIG. 10, one of the resilient stops between the rearwardly extending arms of the tray assembly 24, and the rearwardly directed flanges 104 forming part of the seat 22, is shown. More specifically, the spring 112 on the arm of tray assembly 24 engages the stop 114 on member 104 and is somewhat compressed, thereby absorbing the shock, and slowing the downward descent of the tray 24 in the event that it should be dropped as it is being tilted forward. Instead of the spring and stop as shown in FIG. 10 alternative arrangements for absorbing energy and preventing possible injury to a child may, of course, be provided.

FIGS. 13 and 14 show the adjustable coupling between the shoulder straps 34 and the lap belt 32. More specifically, the lap belt 32 is provided with a series of recesses 122 for alternatively receiving the coupling members 124 which secure the lower end of the belts or straps 34 to the belt 32. The cross-sectional view of FIG. 14 is taken along lines 14—14 of FIG. 13. More specifically, the loop 126 at the end of each shoulder belt 34 has a retractable detent 128 secured to it, with the detents 128 being arranged to be withdrawn from the openings 122 against the force of spring 130, so that the fittings 124 may be separated for a larger child or brought closer together for a smaller child.

For completeness, it may be noted that the base 18 and the seat 22, as well as the tray assembly 24 may be made of high strength moulded plastic reinforced with fibers of glass or other known materials. Alternatively, the arms of the tray assembly 24 could be formed of tubular metal members secured to a plastic tray and post combination. Incidentally, the post 26 is preferably fairly large, at least one-half inch, and preferably one inch wide, and an inch or more in the front-to-back direction. The rear side 26' may be formed of a layer of foam rubber or may be provided with supplemental padding to protect the child.

In conclusion, it is to be understood that the foregoing detailed description and the accompanying drawings are illustrative of the principles of the present invention. Other arrangements may be provided to implement the features described hereinabove. Thus, by way of example, and not of limitation, alternative arrangements may be provided for altering the height of the shoulder straps on the seat, and different arrangements may also be provided for adjustably securing the front ends of the shoulder straps to the lap belt. Similarly, other mechanical mechanisms may be employed to implement the various functions discussed hereinabove. Also, it may be noted that the seat and post 26 are padded where they are to engage the child, and may be laminated and include foam rubber facing the child, or additional padding may be employed. Accordingly, it is to be understood that the present invention is not limited to the precise showing of the drawings and the arrangements as described hereinabove in the detailed description.

What is claimed is:

1. A child safety car seat assembly comprising:
   a car seat base;
   means for securing said base to the seat of an automobile;
   a chair seat mounted on said base;
   a chair seat tray assembly, said tray having rearwardly extending arms pivotally mounted along an axis located to the rear of said chair seat and base, and at about the normal shoulder level of a child sitting in said seat;
   means for pivotally mounting said seat for tilting action relative to said base along said axis;
   means for raising the front of said seat thereby orienting said seat in a reclining position;
   lap belt means secured to the arms of said tray assembly for engaging the lap of a child seated in said seat, as said tray assembly is tilted forward;
   shoulder strap means, extending from the back of said seat and secured to said lap belt means, for engaging the shoulders and body of a child as said tray assembly is pivoted forward;
   means including a large padded center post forming part of said tray assembly and engaging said seat between the legs of a child when said tray assembly is pivoted forward, for locking said tray in its forward position; and
   means for adjusting the height of the point where said shoulder straps extend from the back of said seat, wherein the ehight may be adjusted through a continuous range of heights.

2. A child safety car seat assembly as defined in claim 1 including means for adjusting the position of securing said shoulder strap means to said lap belt means.

3. A child safety car seat assembly as defined in claim 2 including means for locking the position of said shoulder strap means at the desired vertical height on the back of said chair.

4. A child safety car seat assembly as defined in claim 2 wherein said means for adjusting the height of said shoulder straps includes gear means for providing weight adjustment and a shaft on which said gear means is mounted, and said seat assembly including means for mounting said tray assembly and said seat for pivotal movement about said shaft.

5. A child safety car seat assembly comprising:
   a car seat base;
   means for securing said base to the seat of an automobile;
   a chair seat mounted on said base;
   a chair seat tray assembly, said tray having rearwardly extending arms pivotally mounted along an axis located to the rear of said chair seat and base;
   lap belt means secured to the arms of said tray assembly for engaging the lap of a child seated in said seat, as said tray assembly is tilted forward;
   shoulder strap means, extending from the back of said seat and secured to said lap belt means, for engaging the shoulders and body of a child as said tray assembly is pivoted forward;
   means including a large padded center post forming part of said tray assembly and engaging said seat between the legs of a child when said tray assembly is pivoted forward, for locking said tray in its forward position; and
   means for adjusting the height of the point where said shoulder straps extend from the back of said seat, and for retaining said shoulder straps in the adjusted position , wherein the height may be adjusted through a continuous range of heights.

6. A child safety car seat assembly as defined in claim 5 further comprising means for locking said tray assembly in the forward position.

7. A child safety car seat assembly as defined in claim 5 including means for tilting said seat into a reclining position.

8. A child safety car seat assembly as defined in claim 5 including first and second means for receiving a seat belt for restraining said assembly when said seat assembly is facing either forward or backward, respectively.

9. A child safety car seat assembly as defined in claim 5 including means for adjusting the position of securing said shoulder belts to said lap belt means.

* * * * *